United States Patent [19]

Bolte et al.

[11] Patent Number: 4,676,366

[45] Date of Patent: Jun. 30, 1987

[54] HOLDING DEVICE FOR THE RETENTION OF CAN BODIES OR CANS WHICH HAVE ONE OPEN END DURING TRANSPORT OF CONVEYERS

[75] Inventors: Georg Bolte, Vechelde; Helmut Schwarz, Böblingen, both of Fed. Rep. of Germany

[73] Assignees: Schmalbach-Lubeca AG, Brunswick; Eisenmann Maschinenbaugesellschaft mbH, Boblingen, both of Fed. Rep. of Germany

[21] Appl. No.: 782,298

[22] Filed: Sep. 30, 1985

[30] Foreign Application Priority Data

Oct. 5, 1984 [DE] Fed. Rep. of Germany ....... 3436513

[51] Int. Cl.[4] .............................................. B65G 47/86
[52] U.S. Cl. .................................. 198/803.8; 294/99.1
[58] Field of Search ............. 198/803.8, 803.12, 470.1; 294/99.1, 87.2, 33, 87.12

[56] References Cited

U.S. PATENT DOCUMENTS

| | | | |
|---|---|---|---|
| 1,861,282 | 5/1932 | Nelson | 198/803.8 X |
| 3,005,539 | 10/1961 | Wellington | 198/803.8 |
| 3,483,961 | 12/1969 | Girard | 198/803.8 X |
| 3,783,994 | 1/1974 | Tomalty | 198/803.8 |

FOREIGN PATENT DOCUMENTS

| | | |
|---|---|---|
| 0019669 | 12/1980 | European Pat. Off. . |
| 3234441 | 5/1984 | Fed. Rep. of Germany . |
| 922814 | 6/1947 | France .............................. 198/803.8 |
| 1402493 | 8/1975 | United Kingdom . |

Primary Examiner—Joseph E. Valenza
Assistant Examiner—Jonathan D. Holmes
Attorney, Agent, or Firm—Karl F. Ross; Herbert Dubno

[57] ABSTRACT

A holding device for gripping and retaining containers, including can bodies or cans which have one open end, during transport on conveyers, includes a planar carrier which can be connected at the conveyer chain or forms part thereof. A plurality of clamp elements is secured at the carrier. The clamp elements are made of resilient material, and they are fastened for clamping or snap-like retention of the container bodies at diametrically opposite locations respectively in pairs at the carrier. The clamp elements of each pair have respectively crossing adjacent sections, and the inner clamp is adapted to operatively contact the peripheral edge of the respective retained container. The outer clamp is adapted to operatively engage the outer wall surface of the container rim which is directed towards the carrier.

20 Claims, 4 Drawing Figures

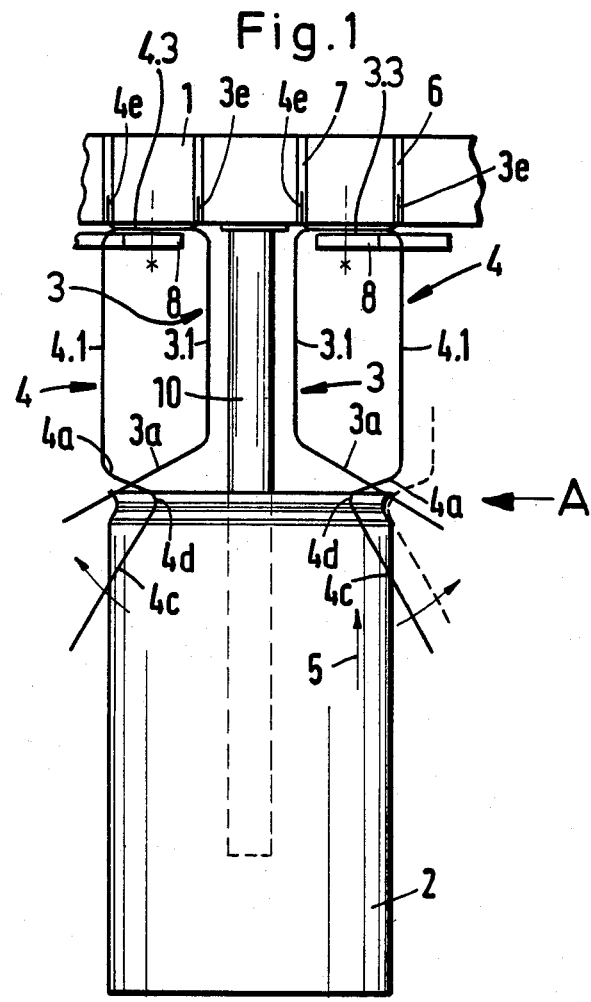
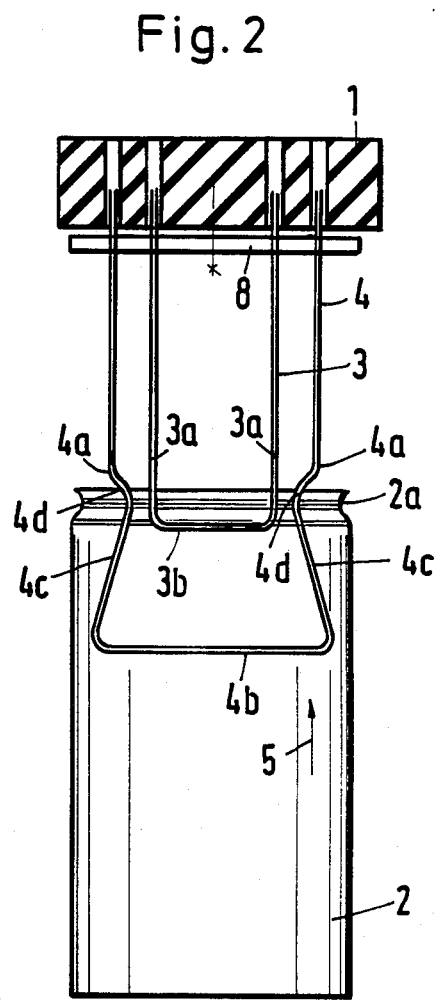
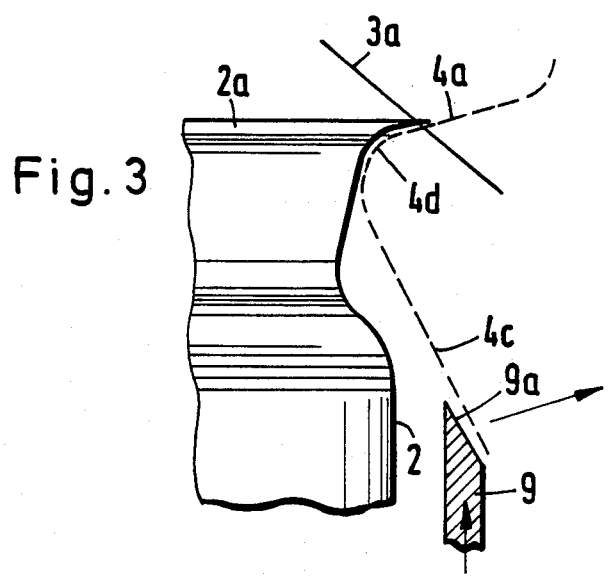

HOLDING DEVICE FOR THE RETENTION OF CAN BODIES OR CANS WHICH HAVE ONE OPEN END DURING TRANSPORT OF CONVEYERS

FIELD OF THE INVENTION

Our present invention relates to a device for the retention of can bodies, or open-end cans, during transport by a conveyer. More particularly, the invention is concerned with a device which grips and holds the can while the conveyer moves through a treatment zone.

BACKGROUND OF THE INVENTION

Generally, the transport of containers, for example, can bodies or open-end cans is carried out with conveyers, for example, to bring the cans to a treatment zone. Such conveyers are also used to move the containers successively through the treatment zone or zones in a predetermined processing sequence.

It is also customary that the containers are disposed upstandingly and in closely spaced sequence on the respective conveyer, but often without lateral supports for the containers. At best, lateral guide bars or rails are provided to preclude lateral displacement on and falling of the containers from the conveyer. The lateral guides are either included in the conveyer or extend as locally fixed bars laterally along the conveyer. For example, the containers are brought to drying or heat treating furnaces, Such as annealing or similar furnaces, as well as being passed through such furnaces. The containers are then carried to other locations or zones provided along the path of the conveyer, or conveyers, until their processing is completed.

Often vacuum-type conveyers are used for the transport of such containers with the cans standing on the conveyer and with open ends directed towards the conveyer. Vacuum or suction is applied at the open end of a container and the can is held in this manner for transport by the conveyer. These systems are characterized by considerable difficulties in producing and sustaining vacuum conditions in the containers or cans which are disposed with their open ends on the conveyer.

There are also known magnetic conveyers which transport cans having one open end and made of a ferromagnetic material. These conveyers securely retain the containers by magnetic forces.

The proper retention of the containers presents problems in known systems, especially when the direction of travel is changed during the course of travel of the conveyer. For example, the direction of travel may change by 90° from the horizontal into the vertical or upward direction or downward direction. Problems can arise because the suction force of the vacuum conveyer, or the magnetic attraction of magnetic conveyers, respectively, can only be effectively applied with full contact of the container on the conveyer.

These particular holding/retention means for producing and maintaining a secure standing of the cans on the known conveyers are not entirely useful for operations calling for full immersion of the conveyed items. They also have only limited applicability in treatment steps in which all sides of the containers will be subjected to the action of a treating medium, during drying, baking, or burning-in of a coating and, at best, can carry out these steps only with considerable disadvantage.

Thus, special holding devices have been developed for treating fully immersed can bodies. The holding devices are arranged above the immersion bath and are comprised of two sieve-like carriers which extend parallel with respect to one another and which are generally planar. The can bodies are held between these carriers and are lowered together with the carriers into the fluid.

The dipping or immersion treatment of can bodies which have one open end cannot be successfully carried out with such cooperating sieve carriers. Instead, rotating tables with immersion cells have been developed for such applications, for example, electro-immersion painting or electrocoating. In these, the container bodies are introduced so that their open ends are downwardly directed as well as being centered and held by an electrode which attaches at the center point on the outer side or surface of the container bottom of the can. A special introduction and removal system for the electrolyte is provided, and the container is surrounded on all sides by the electrolyte (European OS No. 0019669).

OBJECTS OF THE INVENTION

It is an object of the invention to provide a holding device, obviating the drawbacks of prior art methods, which securely retains the can.

It is also an object of the invention to provide an improved holding device which readily releases the can.

It is further an object of the invention to provide an improved holding device which allows retention of the can in such a way that the can is retained at its open end so as to remain substantially perpendicular to the conveyer during transport through various processing stages.

It is still a further object of the invention to provide an improved holding device which allows a change in the direction of travel of the conveyer to occur, but with the containers being securely retained at the conveyer.

SUMMARY OF THE INVENTION

It is an object of the invention to provide a holding device, obviating the drawbacks of prior art methods, which securely retains the can.

It is also an object of the invention to provide an improved holding device which readily releases the can.

It is a further object of the invention to provide an improved holding device which allows retention of the can in such a way that the can is retained at its open end so as to remain substantially perpendicular to the conveyer during transport through various processing stages.

It is still a further object of the invention to provide an improved holding device which allows a change in the direction of travel of the conveyer to occur, but with the containers being securely retained at the conveyer.

These objects are attained in accordance with the invention by providing that claims of resilient material are secured to a substantially planar carrier which can be connected to the conveyer or—in the case of a link-type conveyer—is one link of the conveyer. It is preferred that two pairs of clamps are secured at diametrically opposed sides, respectively, for clamping and snap-like retention of the can bodies.

The clamps have sections or legs which respectively cross at adjacent portions when viewed from the side.

Certain leg or clamp portions of one inner clamp are provided for contact at the peripheral edge of the container, and portions of the other clamp are provided for contact at the outer wall surface of the rim portion which is directed towards the carrier of the can body, or of the can.

The configuration of the holding device is such that it serves for snap-like mounting and retention of a container, as well as controlled release therefrom. For this, the clamp legs can be spread open by the respective container body which is to be retained. Thus, the container body is pressed in axial and upward direction between the clamp legs until the clamp has reached the snap-lock position. Conversely, by a corresponding axial and downward pressure on the rim of the retained container, in the direction away from the conveyer, the container is released for removal from the holding device.

Due to the described contact of the respective clamp legs at the can body and the peripheral edge or rim, which can be a slightly raised or reinforced rim, as is known in the art, both the inner and outer surfaces of the container are fully accessible to the treatment medium.

The contact locations of the clamps at the rim are situated in those regions which upon closing of the can body are positioned within the folding seam. This has the considerable advantage that at the locations of contact between the container and the clamps protection against corrosion is provided by the folding seam. For example, when the container is subjected to a dipping operation, in order to apply a layer to protect the inner and outer container surfaces against corrosion, at the contact points of the clamps there are produced locations which are inadequately protected against corrosion, however, in accordance with the aforementioned description, when the container is sealed at the top, the inadequately coated sections do not cause problems.

It is preferred that the clamps are made of spring steel. It is also preferred that they are releasably secured to the carrier. The clamps can be secured individually and/or in pairs.

In the case of an electrical immersion coating, the clamp legs made of spring steel also serve as contacts for the electrical potential, i.e. they can serve as a pole or terminal to connect the container to the source of electric current.

The clamps can be adjustably arranged at the carrier in order to be adaptable to different container diameters.

A particularly preferred embodiment is attained when each clamp is a U-shaped element and has bent portions at the ends of the free legs which can be held at the carrier by way of a clamping plate for each pair of clamps. In this embodiment, the central portions or legs pointing away from the carrier or clamping plate exhibit a particular form-stability and a high resiliency.

The transverse width of the clamps corresponds to at least one-third of the container diameter.

A preferred embodiment is also achieved when the inner clamp elements or legs of a respectively associated pair, which are to be in contact with the peripheral edge of the container body, at least in the region of their contact at this edge, include sections which are inclined away from one another.

It is also preferred that the outer clamp elements or legs are equipped with bent sections which are inclined toward one another for support at the outer wall surface of the reinforced peripheral edge of the respective container. In order to achieve in this embodiment a secure sliding-in of the respective container, which is to be gripped and held at its peripheral rim, into the clamping/snapping position, it is also preferred that for support at the outer wall surface of the reinforced rim the one set of clamp elements includes sections which respectively commence at the bent sections which are inclined to one another, but which are inclined away from one another and which extend approximately parallel to the contact sections of the other set of clamp elements.

A very stable clamp assembly is achieved when all clamps have sections which extend approximately perpendicular with respect to the carrier and which are followed by the mentioned bent sections.

The clamps are secured at the planar carrier which can simply be a flat plate. The plate can be made of a material which does not conduct electricity when the holding device is used for immersion or dip electrocoating, for example. Also, the plate can be as small as a rod or a bar.

Often it will be useful when the planar carrier is in the shape of a sieve-like plate having a plurality of holes. These holes or passages will allow flowing-through of the medium through which the containers are conveyed, for example, when hot air or gases are blown into the interior of the containers for drying them.

The particular attachment of the planar carrier at the conveyer can readily be achieved in such a way that the plate is securely held while being adapted to be moved with respect to a pivot axis extending in the direction of travel of the conveyer. Accordingly, for immersion of the containers which are initially disposed above the conveyer, for example, the carriers are swung, or turned or pivoted, to immerse the containers to be treated and to move them in the pending position through the bath. By a corresponding retraction or swinging-back of the carrier at the end of the bath, the containers are lifted again out of the bath and brought into the initial position.

BRIEF DESCRIPTION OF THE DRAWING

The above and other objects, features and advantages of the present invention will become more readily apparent, reference being made to the accompanying drawing, in which FIG. 1 is a partial side elevation of a holding device;

FIG. 2 is a side elevation of the holding device according to FIG. 1 in the direction of arrow A;

FIG. 3 is a large scale detail of the device according to FIG. 1 in which the release of the can having one end is indicated.

SPECIFIC DESCRIPTION

Figure 4:
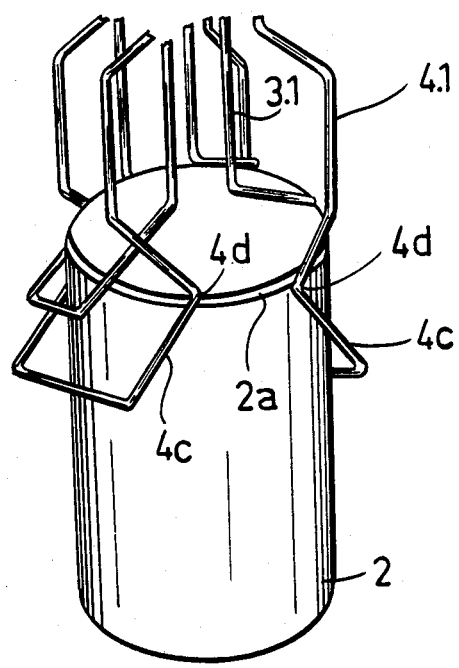
FIG. 4 is a perspective view of the device according to FIG. 1.

The holding device shown in the drawing is comprised of planar carrier 1. In the indicated example, this is a flat carrying plate made of a material which does not conduct electricity. The carrier 1 is connected in a conventional way, not shown in detail, to a conveyer, for example a continuous or endless conveyer. Alternatively, the plates can form part of a link-type conveyer in which they are connected to one another by respective joints to extend in the longitudinal direction of the conveyer.

Downwardly projecting clamps are secured at the planar carriers 1 for gripping and snap-like retention of cans 2, or similar containers which, in this example, are in the form of cans which are open at one end. With reference to FIG. 1, two clamps pairs are secured at one planar carrier 1. The clamp pairs engage at diametrically opposite locations of the cans or containers 2, and particularly in the region of the rolled or reinforced rim 2a thereof. In this embodiment, each pair of clamps has an inner clamp or clamp element 3 which cooperates with the respective outer clamp or clamp element 4. Also with reference to FIG. 1, each clamp element has sections or leg portions 3a and 4a, respectively, which cross or intersect one another, and the clamps 3 and 4 cooperate, accordingly, due to their crossing portions to retain a container 2.

As is indicated in FIG. 2, the clamps differ in width, i.e. the inner clamp 3 is narrower than the outer clamp 4, and each clamp 3 reaches through the associated clamp 4, as is shown in FIG. 1.

The clamps 3 and 4 are generally bent and U-shaped elements (i.e. stirrup-shaped members) which project with the central transverse leg portions or sections 3b and 4b (FIG. 2) away from the planar carrier 1. Each clamp includes two sections 3a and 4a, with a section 3a being relatively closely positioned with respect to the adjacent section or leg portion 4a and adapted to engage the container 2, particularly at the rim 2a thereof. The leg portions or sections 3a can contact the container 2 at the edge of the rim 2a, and the sections 4a can contact at the outer wall surface of the rim 2a.

In the shown embodiment, the clamps 3 and 4 are made of spring steel. The longitudinal legs or vertical sections 3.1 and 4.1 project generally perpendicularly from the carrier 1, and approximately parallel with respect to one another. Accordingly, the clamps 3 and 4 of each pair of clamps, in order to assume the shown clamping/retention position of FIGS. 1 and 2, are resiliently spread from their rest or starting position and thus they are also adapted to resiliently contact the rim 2a of a container 2 with their sections 3a and 4a. At the sections 4a of each clamp 4 there follow bent or inclined sections 4c which are inclined in the direction opposite that of the direction of inclination of the sections 4a. The mentioned transverse leg portion 4b closes the lower end of the outer clamp 4.

As is shown in FIG. 1, the inclined sections 4c extend approximately parallel to the sections 3a of the clamps 3.

Because of the mentioned configuration a particularly simple introduction and retention of a container 2 in a holding device is achieved, with the clamping or retention position being indicated in FIGS. 1 and 2.

It will only be necessary to align the containers 2 with respect to the associated adjacent pairs of clamps and to press them in the direction of their longitudinal axes, that is, in the direction of the arrow 5, FIG. 1, against the clamps. The rolled rim 2a initially contacts the inclined sections or legs 4c of the outer clamps 4 and presses these apart, due to their spring action, until the rim 2a engages at the leg portions 3a of the inner clamp 3. On further movements, the legs 3a are spread in outward direction and during this movement the sections 4a, particularly their curved portions 4d which are provided between the sections 4a and 4c of the outer clamps 4, reach to or into the rounded portion of the rim 2a of the respective container 2. The container 2 is then supported or engaged in this region on the outer wall side of the rolled rim 2a and the sections 3a of the clamps 3 are resiliently contacting at the edge of the rim 2a.

In order to remove the containers 2 from the holding device, it is merely required to move the inclined sections 4c, or the central transverse legs 4b, of the outer clamps 4 which contact the container 2 at diametrically opposite locations, in an outward direction until the sections 4a, particularly the curved or rounded portions 4d are no longer in contact at the rolled rim 2a. At this moment, due to the spring action of the leg portions 3a of the clamps 3, the container 2 is ejected in the direction opposite to that of arrow 5, and the inner clamp 3 is effective also as an ejector spring.

In the shown example, the clamps 3 and 4 have ends 3e and 4e at which follow sections 3.3 and 4.3 which extend substantially in the plane of the planar carrier 1.

The ends or end sections 3e and 4e are secured in bores 6 and 7 of the carrier 1. The clamps 3 and 4 are further secured on the carrier 1 by means of a clamping plate 8 which is connected to the carrier 1 by way of screws, not shown.

In the embodiment, the clamps 3 and 4 cannot be shifted against one another. In the absence of the ends 3e and 4e in the bores 6 and 7, the clamps can be held at the carrier 1 by means of the clamping plate 8 alone for adjustably assuming various positions with respect to one another.

FIG. 2 shows clearly that the inner clamps 3 are narrower than the outer clamps 4, and their sections 3a and 4a are disposed with respect to one another in a crossing manner and at relatively closely spaced locations so that they can respectively contact the rim 2a of the container 2.

It is assumed that the holding device is used for an electrocoating or similar immersion treatment of cans 2. For this purpose, FIG. 1 shows an electrode 10 on the planar carrier 1 which carrier, as mentioned, is made of a material which does not conduct electricity The electrode 10 reaches into the interior of the can 2 which is held between the clamps 3 and 4.

FIG. 3 indicates the release of a can 2 from the holding device as briefly described previously. Thus, there is provided a spreading tool 9 which forces an increasing spreading action on the inclined sections 4c of the clamp 4, with continuing displacement of the surface 9a in the direction of the rim 2a, in outward direction until the section 4a and particularly the curved portion 4d disengages the rim 2a for release of the container 2 from the respective conveyor.

In practical use, the transfer and the delivery of the containers to or from the holding device, is carried out in such a way that the two conveyers are spaced apart with the upper conveyer being equipped with carriers 1. The cans 2 are loaded on the lower conveyer so that their rims 3a are upwardly directed, and the cans are spaced at the spacing corresponding to that of the holding devices on the upper conveyer. At the merging point for the two conveyers, the cans 2 are pressed, as described, between the respective pairs of clamps until they are held by these in the clamping condition shown in FIGS. 1 and 2.

For release of the cans 2, for example, for transfer to a further conveyer which extends parallel to the upper conveyer with the holders 1, locally fixed spreading devices are disposed on both sides of the upper conveyer. The spreading devices effect, with the surfaces 9a, an increasing spreading of the legs 4c of the clamps 4, until ejection of the cans 2 by the clamp 3 or section 3a is achieved, and the cans 2 are pressed by means of the spring action of these clamps onto the further conveyer. Due to the gradual separation of the two parallel conveyers from one another, which operate at synchronous speeds, the cans 2 are removed from the reach of the holding devices

We claim:

1. A holding device, especially for the releasable retention on a conveyer of a can having an open end, for transport through a treatment zone along a path of the conveyer, said device comprising:
at least one carrier connectable to said conveyer; and
a plurality of clamps secured to said carrier to project therefrom, said clamps being made of a resilient material and adapted to be arranged for snap-like retention of a respective container at diametrically opposite locations thereof, whereby respectively two pairs of clamps are oppositely arranged with respect to each other, and the clamp legs of each pair have respectively crossing adjacent sections, and wherein respectively one clamp is adapted to be in operative contact at the peripheral edge of a retained container, and the other clamp of a respective pair is adapted to operatively engage at an outer wall surface of the respective can rim turned towards said at least one carrier.

2. The device defined in claim 1 wherein each clamp element is made of spring steel.

3. The device defined in claim 1 wherein each clamp element is individually secured to said carrier.

4. The device in claim 1 wherein a clamp pair is secured to said carrier.

5. The device defined in claim 1, further comprising a clamping plate, and wherein at least one clamp pair is made of U-shaped elements, and wherein respective free end portions of said U-shaped elements are held at said carrier by said clamping plate.

6. The device defined in claim 1 wherein each pair of clamps includes an inner clamp element and an outer clamp element, and each clamp element has a width which corresponds to at least one third of the diameter of a container to be retained.

7. The device defined in claim 6 wherein each inner clamp element includes sections adapted to operatively contact the peripheral edge of the rim of the respective container, and said sections, at least in the region of their contact at the peripheral edge, are inclined and directed away from one another; and wherein each outer clamp includes sections which are inclined towards one another for support at the outer wall surface of the respective rim.

8. The device in claim 6 wherein each outer clamp element includes further sections which extend approximately parallel to the contacting sections of the inner clamp elements, said further sections being provided contiguous at the respective sections which are inclined and directed away from one another.

9. The device defined in claim 8 wherein each clamp includes at least one section which extends substantially perpendicularly with respect to said at least one carrier and at which contiguously follows the respective adjacent section.

10. The device in claim 1 wherein said carrier is a plate.

11. The device defined in claim 10 wherein said plate is a sieve-like plate.

12. The device defined in claim 1 wherein said carrier is made of a material which does not conduct electricity.

13. The device defined in claim 1 wherein said carrier is a link of said conveyer.

14. In a holding device for cans which have one open end which are to be transported on a conveyer, especially for conveying through treatment zones, the improvement which comprises a carrier adapted to be connected to the respective conveyer; and projecting clamps of resilient material secured to said carrier, said clamps being arranged in pairs for snap-on retention of a can body at diametrically opposite locations, and each pair of clamps having clamp legs which respectively cross at adjacent sections, with respectively one clamp being provided to be in operative contact a the peripheral edge, and the other clamp being provided for support at the outer wall surface of the rim directed towards said carrier.

15. The improvement defined in claim 14 which is adapted to cooperate with a fixed tool for separating a respective clamp from a retained container.

16. In a holding device for a can which has an open end for transport on a conveyer, especially for conveying the can through a treatment zone, the improvement wherein on one planar carrier (1) connectable or adapted to form a link of the conveyer, projecting clamps (3;4) of resilient material are fastened and for clamping or snap-on like retention of the bodies or the cans (2) at diametrically opposite locations respectively two pairs of clamps are arranged in juxtaposition, the clamp legs of which have respectively crossing adjacent sections (3a,4a) and of which respectively one clamp (3) is provided to be in contact with the peripheral edge and the other clamp (4) is provided for support at the outer wall surface of a rolled rim (2a) directed towards the carrier of the can.

17. The improvement defined in claim 16 wherein the clamps (3;4) are made of spring steel and are releasably held at the carrier (1).

18. The improvement defined in claim 16 wherein each clamp stirrup-shaped and with bent portions at the ends of the free legs is held at the carrier by means of a clamping plate associated with a respect to the carrier (1) from which follow the bent sections (3a, 4a).

19. The improvement in claim 16 wherein the planar carrier (1) is a perforated plate.

20. The improvement in claim 16 wherein the planar carrier is a plate composed of an electrically insulating material.

* * * * *